Feb. 6, 1940.  M. P. YOUKER  2,189,645
PROCESS FOR THE CONVERSION OF HYDROCARBONS
Filed Feb. 11, 1935  2 Sheets-Sheet 1

Fig 1

INVENTOR.
Malcolm P. Youker
BY
ATTORNEYS.

Feb. 6, 1940. M. P. YOUKER 2,189,645
PROCESS FOR THE CONVERSION OF HYDROCARBONS
Filed Feb. 11, 1935 2 Sheets-Sheet 2

FIG 2

INVENTOR.
Malcolm P Youker
BY JB Hudson
ATTORNEYS.

Patented Feb. 6, 1940

2,189,645

UNITED STATES PATENT OFFICE 2,189,645

PROCESS FOR THE CONVERSION OF HYDROCARBONS

Malcolm P. Youker, Bartlesville, Okla., assignor to Phillips Petroleum Company, Bartlesville, Okla., a corporation of Delaware Application February 11, 1935, Serial No. 6,124

19 Claims. (Cl. 196—10)

The present invention relates to a process and apparatus for the thermal conversion of hydrocarbons and relates particularly to a process and apparatus for polymerizing normally gaseous hydrocarbons to normally liquid hydrocarbons.

Such a polymerizing process was originally disclosed in my Patent No. 1,800,586 and the present invention relates to improvements in such a process whereby an increased yield of normally liquid hydrocarbons may be obtained.

In another of my patents, namely No. 1,962,107, I have disclosed an improved method of fractionation which is particularly useful in connection with the aforesaid polymerizing process, in that it provides for an efficient and economical method of separating the normally gaseous from the normally liquid products of the polymerizing process. This improved method of fractionation comprises broadly the steps of first fractionating the products of the polymerizing process under relatively high superatmospheric pressure to sharply separate the normally gaseous hydrocarbons from the normally liquid hydrocarbons and subsequently fractionating the normally liquid hydrocarbons under comparatively lower pressure to separate gasoline contained therein from the heavier products.

My present invention has for one of its principal objects the improvement in the above described fractionating process, which provides a method of economically recovering, in liquid form, a substantial portion of the normally gaseous hydrocarbons separated in the first fractionating step which are desirable as recycle stock for the polymerizing process in order to increase the over-all yield of normally liquid hydrocarbons from the process.

Several methods of accomplishing this principal object will be presented in the following disclosure.

One such method provides a process for utilizing the energy contained in the compressed gaseous products of polymerization to effect cooling of the gaseous products and utilizing the resulting cooled gaseous products to assist in condensation of the said gaseous products in order to recover a maximum quantity of liquefiable constituents of the gaseous products. In this method the invention consists broadly in making double use of the pressure developed in the polymerization of the normally gaseous hydrocarbons. The pressure developed is first used to aid in sharply separating gaseous from liquid products of polymerization, and second for developing refrigeration whereby a substantial portion of the gaseous products are condensed and the resulting condensate returned to the polymerizing step.

Another method includes absorption of constituents of the gaseous products of polymerization in relatively heavy oil followed by introduction of the enriched absorption oil to the fractionating system either by way of the transfer line from the polymerization zone or by direct introduction into the high pressure fractionating step.

Still a third method originally disclosed broadly in my pending application Serial No. 481,318, now Patent No. 2,027,460, provides for the controlled introduction of relatively large quantities of heavy oil into the high pressure fractionating step either directly or by way of the transfer line from the polymerizing zone in order to absorb a large portion of the excess heat contained in the products of polymerization thereby condensing a considerable portion of the vaporous products of polymerization, and thus effecting, under controlled conditions, such changes in the composition of the vaporous products as to permit the high pressure fractionator to operate at greatly improved efficiency.

This latter method is not to be confused with the ordinary method of introducing relatively cool oil into the transfer line of a cracking process for the purpose of stopping the cracking reaction and preventing the formation and deposit of coke in the transfer line. While my method may also accomplish this particular result, I contemplate using quantities of oil greatly in excess of that used in stopping a cracking reaction. For example in my process I may introduce 4,000 to 6,000 barrels per day of heavy oil into the transfer line or high pressure fractionator of a gas polymerization process charging 6,000 barrels per day of normally gaseous hydrocarbons in a liquid phase such as butane whereas in oil cracking processes the amount of oil introduced for the purpose of stopping the cracking reaction is usually less than 2,000 barrels per day for 6,000 barrels of charging oil per day.

The importance of this will be evident from the following discussion of gas polymerization. In the polymerization of gases such butane and propane to liquid products in the gasoline and heavier range, temperatures of about 1,000° F. or higher are usually employed depending upon the pressure used which is usually 1,000–3,000 per square inch. At such temperatures, the products leaving the transfer line are almost entirely vaporous and because of the type of charge and nature of the products, will contain a large proportion of normally gaseous materials such as butane and propane, which, as a result of the high temperatures employed, will be heated to temperatures greatly in excess of their critical temperatures and regardless of the pressure maintained on the fractionator a very large quantity of reflux will be required at the top of the fractionator to cool these gases below their critical temperature so that sufficient condensation for proper fractionation to separate butane and lighter gases from heavier materials may occur. In other words under such conditions the materials in the fractionating tower will be in gaseous condition during their passage through the major portion of the tower and only a relatively small section of the fractionating tower, that near the upper portion, will be able to serve as an efficient fractionating device, and then only when a very large quantity of top reflux is used. By my method of introducing a very large quantity of relatively heavy oil into the high pressure fractionator, I am able to condense and absorb substantially all of the constituents of the products of polymerization which are heavier than butane while at the same time I will so reduce the temperature of the remaining vaporous material, that a much smaller quantity of top reflux will be required and a much larger section of the fractionator will come into use as an efficient fractionating device, and thus enable me to obtain a greatly improved separation between butane and propane and heavier products. Since the recycle stock for the gas polymerization process is preferably butane a good method of separation is greatly to be desired in order to obtain a maximum yield of gasoline from the butane in the charging stock.

Other objects and advantages of my new invention will become apparent in view of the following description taken in conjunction with the attached drawings.

Figure 1:
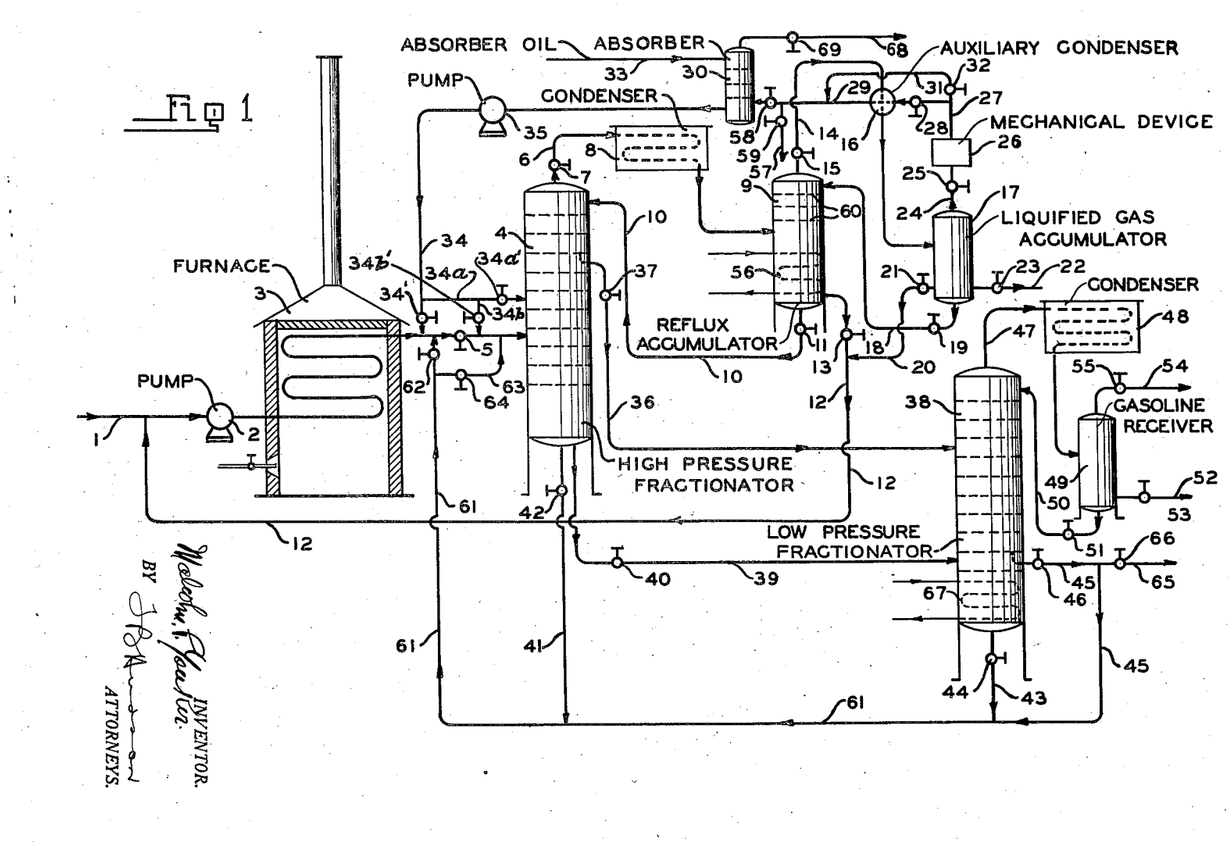
Figure 1 is a diagrammatic arrangement of one form of apparatus that may be used in conducting my improved process.

Referring to Figure 1, a charging pipe 1 in which is mounted a pump 2 leads through a furnace 3 into a high pressure fractionator 4. A pressure control valve 5 is mounted in the pipe 1 between the furnace 3 and fractionator 4. A vapor outlet pipe 6 in which is mounted a valve 7 leads from the upper portion of fractionator 4 through a condenser 8 and into a reflux accumulator 9. Reflux accumulator 9 may be simply a separator or it may be a combined separator and bubble tower fitted with bubble plates 60 as illustrated. A pipe 10 in which is mounted a valve 11 leads from the lower portion of accumulator 9 into the upper portion of fractionator 4. A second pipe 12 in which is mounted a valve 13 leads from the lower portion of accumulator 9 into charging pipe 1. A coil 56 through which a heating fluid may be circulated is located in the lower portion of accumulator 9. A pipe 14 in which is mounted a valve 15 leads from the upper portion of accumulator 9 through an auxiliary condenser 16 (high pressure side) into a liquefied gas accumulator 17 from the lower portion of which a pipe 18 in which is mounted a valve 19 leads back into the upper portion of accumulator 9. A second pipe 20 in which is mounted a valve 21 leads from the lower part of accumulator 17 into pipe 12. A third pipe 22 in which is mounted a valve 23 leads from the lower portion of accumulator 17. A pipe 24 in which is mounted a valve 25 leads from the upper portion of accumulator 17 to a mechanical device 26, the function of which will be hereinafter described. A pipe 27 in which is mounted a valve 28 leads from mechanical device 26 to auxiliary condenser 16 (low pressure side) from which a pipe 29 leads into an absorber 30. A pipe 31 in which is mounted a valve 32 leads from pipe 27 directly into pipe 29 providing a by-pass around auxiliary condenser 16. A pipe 68 in which is mounted a valve 69 leads from the upper portion of absorber 30. A pipe 33 leads into the upper portion of absorber 30 and a pipe 34 in which is mounted a pump 35 leads from the lower portion of absorber 30 and connects absorber 30 with pipe 1 at a point between the furnace 3 and fractionator 4. A branch pipe 34a in which is mounted a valve 34a' leads from pipe 34 into an intermediate portion of fractionator 4 at a point above the point of entry of pipe 1 into fractionator 4. A branch pipe 34b in which is mounted a valve 34b' connects pipe 34 by way of pipe 34a into pipe 1 at a point between valve 5 and fractionator 4. A pipe 36 in which is mounted a valve 37 leads from an intermediate portion of fractionator 4 to a low pressure fractionator 38. A second pipe 39 in which is mounted a valve 40 leads from the lower portion of fractionator 4 into fractionator 38. A pipe 41 in which is mounted a valve 42 leads from the lower portion of fractionator 4 and connects into a pipe 61 in which is mounted a valve 62 which connects to pipe 1 at a point between the furnace 3 and valve 5 or by way of pipe 63 in which is mounted a valve 64 into pipe 1 between valve 5 and fractionator 4. A pipe 43 in which is mounted a valve 44 leads from the lower portion of fractionator 38 and connects into pipe 61, and a heating coil 67 is provided in the lower portion of fractionator 38. A pipe 45 in which is mounted a valve 46 leads from an intermediate portion of fractionator 38 and connects into pipe 61. A pipe 65 in which is mounted a valve 66 also leads from pipe 45. A pipe 47 leads from the upper portion of fractionator 38 through a condenser 48 into a gasoline receiver 49 from which a pipe 50 in which is mounted a valve 51 leads into the upper portion of fractionator 38. A pipe 52 in which is mounted a valve 53 leads from the lower portion of receiver 49 and a pipe 54 in which is mounted a valve 55 leads from the upper portion of receiver 49.

The apparatus above described will be used in carrying out my new improvements in the following manner.

Normally gaseous hydrocarbons, preferably under sufficient pressure to maintain them in a liquid state, will be charged by pump 2 through pipe 1 which passes through a furnace 3 and thence into high pressure fractionator 4. While passing through that portion of pipe 1 which is within furnace 3 the normally gaseous hydrocarbon material will be heated and partially polymerized to gasoline and heavier materials. Pressure control valve 5 may be manipulated to maintain any desired pressure on the material in pipe 1 during its passage through furnace 3. A mixture of liquid and vapor will emerge from pipe 1 into fractionator 4 where a separation between vapor and liquid will be effected. Vapor will flow upwards through fractionator 4 which is preferably of the bubble tray type and will pass from the upper portion of fractionator 4 through pipe 6 and valve 7 which will be manipulated to hold any desired pressure in the fractionator 4 and thence through condenser 8 wherein a portion of the vapor will be condensed and condensate and uncondensed gases will then flow into reflux accumulator 9 which will preferably be fitted with bubble trays 60 in order that the accumulator 9 may serve as a fractionator if desired, although this will not be necessary in all cases. Heating fluid may be passed through coil 56 which is located in the lower portion of accumulator 9 to aid in fractionating the gas-liquid mixture entering accumulator 9 from condenser 8. A portion of the liquid which will collect in the lower portion of accumulator 9 will be returned through pipe 10 to the upper portion of fractionator 4 and valve 11 will be utilized to control the quantity of liquid so returned so as to condense within the fractionator 4 substantially all the gasoline and heavier constituents contained in the vapors flowing upward through the fractionator 4.

By controlling the fractionation in fractionator 4 so that substantially all the gasoline and heavier materials contained in the vapors flowing upward in the fractionator will be condensed therein, the gases leaving the top of fractionator 4 will consist of hydrocarbons lighter than gasoline such as butane, propane and still lighter materials. As a result of the condensation effected in condenser 8 and the rectification effected in accumulator 9 the liquid which will collect in accumulator 9 will consist principally of the less volatile portion of the gases leaving fractionator 4. This less volatile portion will usually consist principally of butane.

Liquid which will collect in accumulator 9 in excess of that which will be returned to fractionator 4 will pass through pipe 12 and valve 13 to pipe 1 where it will be mixed with the original charge and again pass through the polymerization step.

The liquid returned from accumulator 9 to the fractionator 4 will flow downwards through the fractionator 4 and will condense the gasoline and heavier materials which will be withdrawn from the fractionator 4 through pipes 36 and 39, which will discharge the material so withdrawn into low pressure fractionator 38. Valves 39 and 40 will be manipulated to control the quantity of material withdrawn through pipes 36 and 39 respectively. Liquid material which will collect in the lower portion of fractionator 4 may be withdrawn from fractionator 4 through pipe 41, and may be returned to pipe 1 via pipes 61 and 63 instead of to fractionator 38. The amount of material passing into pipe 1 through either one or both of these pipes 61 and 63 will be controlled by proper manipulation of valves 62 and 64 respectively. Valve 42 mounted in pipe 41 will be manipulated to control the quantity of liquid entering pipe 61 from fractionator 4.

The gases which will separate from the liquid in accumulator 9 will pass therefrom through pipe 14 through auxiliary condenser 16 (high pressure side) and into liquefied gas accumulator 17. A valve 15 mounted in pipe 14 may be manipulated to hold any desired pressure on the preceding portions of the fractionating system. In passing through the auxiliary condenser 16 a portion of the gases will be condensed and a mixture of liquid and gas will be delivered by the pipe 14 into accumulator 17, wherein the still uncondensed gases will separate from the liquid and will pass from accumulator 17 through pipe 24 and valve 25 and thence through mechanical device 26 which may be an expansion engine, vapor turbine or any other piece of mechanical equipment through which the gases leaving accumulator 17 may be expanded in doing mechanical work. The gases as a result of doing mechanical work in expanding will become considerably cooled and the resulting cooled and expanded gases will pass from the mechanical device 26 through pipe 27 and valve 28 into auxiliary condenser 16 (low pressure side) and thence through pipe 29 into absorber tower 30. A pipe 31 in which is mounted a valve 32 leads from pipe 27 around condenser 16 into pipe 29. By closing valve 28 and opening valve 32 the cooled and expanded gases passing through pipe 27 may be by-passed around condenser 16 and passed directly to absorber tower 30.

The cooled gases entering absorber tower 30 will pass upwards through absorber tower 30 and will pass therefrom through pipe 68 and valve 69. Absorption oil, such as gas oil or the like will be introduced into the upper portion of tower 30 by means of pipe 33 and will flow downward through tower 30 in contact with the upward flowing gas and as a result of the said contact will absorb constituents of the gas. The absorption oil including absorbed constituents of the gas will collect in the lower portion of tower 30 and will pass therefrom through pipe 34 to pump 35 which will discharge this absorption oil into pipe 1 at a point between furnace 3 and valve 5. Instead of entering pipe 1 between the furnace 3 and valve 5 the enriched absorption oil may be introduced into the fractionator 4 by way of pipe 34a or into pipe 1 between the valve 5 and fractionator 4 by way of pipe 34b. Valves 34', 34a', and 34b' are provided in pipes 34, 34a, and 34b respectively for the purpose of controlling the quantity of liquid introduced at each or all of the points described.

Of the liquid which will collect in the lower part of accumulator 17 a portion thereof will be returned through pipe 18 and valve 19 to the upper part of accumulator 9 as reflux liquid, and liquid in excess of that returned to accumulator 9 may pass through pipe 20 and valve 21 into pipe 12 and thus return to the polymerizing step, or a part of this liquid may be withdrawn from accumulator 17 through pipe 22 and valve 23 to be disposed of in some other manner.

Returning now to the low pressure fractionator 38 into which the gasoline and heavier products from fractionator 4 will be introduced by means of pipes 36 and 39 as previously described. In passing from fractionator 4 to fractionator 38 the gasoline and heavier liquids will pass from a region of relatively high super-atmospheric pressure to a region of relatively low super-atmospheric pressure, for as pointed out in the introductory paragraphs of the present application one of the features of the present invention is the fractionation of gasoline and heavier liquids under lower pressure than that maintained during the fractionation of all of the products of polymerization wherein the gases are initially separated from gasoline and heavier liquid leaving fractionator 4. Vaporization of the gasoline and heavier liquid will take place in fractionator 38 and vapors containing substantially all of the gasoline will separate from unvaporized liquid and will flow upward through fractionator 38 and those vapors which reach the top of fractionator 38 will pass therefrom through pipe 47, and condenser 48 into gasoline receiver 49. A heated fluid may be circulated through heating coil 67 to aid in vaporizing the gasoline contained in the liquid collecting in the lower portion of fractionator 38. In passing through condenser 48 the vapors will be at least partially condensed into liquid gasoline and a mixture of gasoline and uncondensed vapors will be delivered into receiver 49 wherein uncondensed vapors will separate from the gasoline and will pass from the receiver 49 through pipe 54. Valve 55 mounted in pipe 54 will be manipulated to hold any desired pressure on the low pressure fractionating system which includes fractionator 38, condenser 48, receiver 49 and their interconnecting pipes. A portion of the gasoline which will collect in receiver 49 will pass through pipe 50 and will be returned to the upper portion of fractionator 38 to serve as reflux. Valve 51 mounted in pipe 50 will be manipulated to control the quantity of gasoline returned to fractionator 38 to control the fractionation therein so that all material heavier than gasoline will be condensed within fractionator 38 and only gasoline and lighter vapors will remain uncondensed therein. Gasoline which will collect in receiver 49 in excess of that necessary for refluxing fractionator 38 will be withdrawn from receiver 49 through pipe 52 and valve 53 and will be delivered to storage, not shown, as a final product of the process. By means of pipe 45 in which is mounted valve 46 which leads from an intermediate portion of fractionator 38, distillates condensed within fractionator 38 may be withdrawn from fractionator 38 and may be passed into pipe 61 for introduction into pipe 1, or such distillates may be withdrawn from the process by way of pipe 65 in which is mounted valve 66. Liquid which will collect in the lower portion of fractionator 38 will be withdrawn therefrom through pipe 43 and valve 44 and may also be discharged into pipe 61.

As indicated by the above description, the material passing through pipe 61 to fractionator 4 by way of pipe 1 may be withdrawn either from the bottom of fractionator 4, the bottom of fractionator 38 or from an intermediate portion of fractionator 38. The quantity and type liquid thus returned, whether distillate oils or heavier, will depend upon the temperature employed in the polymerization step, the conditions desired in the fractionator 4, etc. As previously indicated above, the quantity of oil introduced into the fractionator 4 may be substantially equal to the quantity of material charged to the polymerizing process. This particular relationship, while useful in some cases, is not fixed and may vary with conditions as indicated, but in every case the quantity of oil fed into the pipe 1 from pipe 61 will be substantially greater than that necessary to merely stop the conversion reaction to prevent deposition of carbon in pipe 1 and fractionator 4.

The temperature to which the normally gaseous hydrocarbons are heated in order to effect polymerization thereof will usually lie within the range 750° to 1250° F. and in some cases higher or lower depending upon the type of charging stock, whether relatively saturated or unsaturated, the yield per pass desired, the pressure employed and the type products desired.

The pressure maintained on the normally gaseous hydrocarbons undergoing polymerization in that portion of pipe 1 within the furnace 3 will be regulated by means of valve 5 and depending upon the type charging stock, the products desired, and the temperatures to be employed will lie within the range 500 to 5000 pounds per square inch. While the range of pressures usually employed lies between 1000 and 3000 pounds per square inch useful results may be obtained within the broader range and the particular pressure employed will be dependent upon the various factors indicated.

The pressure maintained on that portion of the fractionating system comprising fractionator 4, condenser 8, accumulator 9, condenser 16 (high pressure side), accumulator 17 and the interconnecting pipes will most usually be between 200 and 600 pounds per square inch, the particular pressure depending upon the degree of fractionation desired, the temperature of the vapors to be fractionated, etc. The pressure in the condenser 8 and accumulator 9 may be lower than that in fractionator 4 if desired, and by manipulation of valves 7 and 15 any desired pressure or combination of pressures may be maintained on this portion of the fractionating system. Likewise condenser 16 (high pressure side) and accumulator 17 may be maintained at the same or lower pressure than accumulator 9, and valve 25 may be manipulated so as to control this pressure as desired.

In passing through the mechanical device 26 the pressure on the gases leaving accumulator 17 may be reduced to substantially atmospheric or to a pressure sufficient merely to force the expanded gases through the succeeding portions of the apparatus. The absorber 30 will usually be under this reduced pressure and valve 32 will be manipulated to regulate the pressure in these parts of the equipment.

Mechanical device 26 together with condenser 16 illustrates a single stage expansion unit. Due to the usual presence of water vapor in the gases leaving accumulator 17 it will usually be found desirable to limit the degree of cooling to a temperature above 32° F. to avoid formation of ice and subsequent freezing up of the apparatus. In such cases multi-stage expansion will probably be necessary for control of the degree of cooling and a series of expansion units similar to that illustrated could be used. Where no water vapor is present single stage expansion to obtain the maximum degree of cooling of the gases may be used.

The pressure maintained on fractionator 38, condenser 48 and accumulator 49 will be some pressure lower than that maintained on fractionator 4 and while this lower pressure will most frequently be substantially atmospheric it may be found desirable to hold a somewhat higher than atmospheric pressure in fractionator 38, condenser 48 and accumulator 49. This pressure will be regulated by manipulation of valve 55.

The absorption oil passing through absorber 30 to pipe 1 or fractionator 4 may be oil withdrawn from fractionators 4 and/or 38 or it may be oil from another source. The absorption oil may consist of kerosene distillate, gas oil, or fuel oil as conditions dictate. Similarly the oil entering pipe 1 and fractionator 4 by way of pipe 61 may be obtained from some source outside the present process and the quantity introduced through pipe 61 may be less than that required in accordance with the description given above, the additional quantity required being supplied by that introduced into the pipe 1 or fractionator 4 by way of pipe 34. Under certain conditions it may be found desirable to supply all of the extraneous oil introduced into pipe 1 and fractionator 4 by way of absorber 30 and pipe 34 and to supply none of such oil through pipe 61, or all the required oil may be introduced into pipe 1 by way of pipe 61 and none by way of pipe 34.

It will be evident from the foregoing that I have disclosed a combination of steps for polymerizing normally gaseous hydrocarbons to normally liquid hydrocarbons, which includes the step of supplying sufficient relatively heavy oil to the pressure fractionation step as described to obtain a sharp separation between the butane and lighter portion and the gasoline and heavier portion of the products of the polymerization, and a series of steps for efficiently fractionating the butane and lighter materials to separate butane from propane and lighter and to recover substantially all of the butane therefrom in order that the maximum amount of recycle stock (butane) may be returned to the polymerizing step and thus obtain a maximum yield of gasoline and heavier products from the original charge.

By practicing my invention by the above described process a maximum yield of gasoline and heavier materials will be obtained from the initial charge of butane or lighter hydrocarbons due principally to the series of steps utilized to recover the maximum amount of recycle stock from the products of polymerization. However I find that in certain cases, due to economic conditions, it may be desirable to simplify the major process somewhat at the sacrifice of a small portion of the possible yield. In such cases by eliminating the supercooling of the gases entering accumulator 17, and the apparatus required therefor I may simplify the entire process at the cost of some recycle stock which would be recoverable by the process above described. Thus simplified the process would still result in improved yields over the processes outlined in my issued patents and pending application.

This simplified process will now be described in connection with Figure 2 of the attached drawings.

Figure 2:
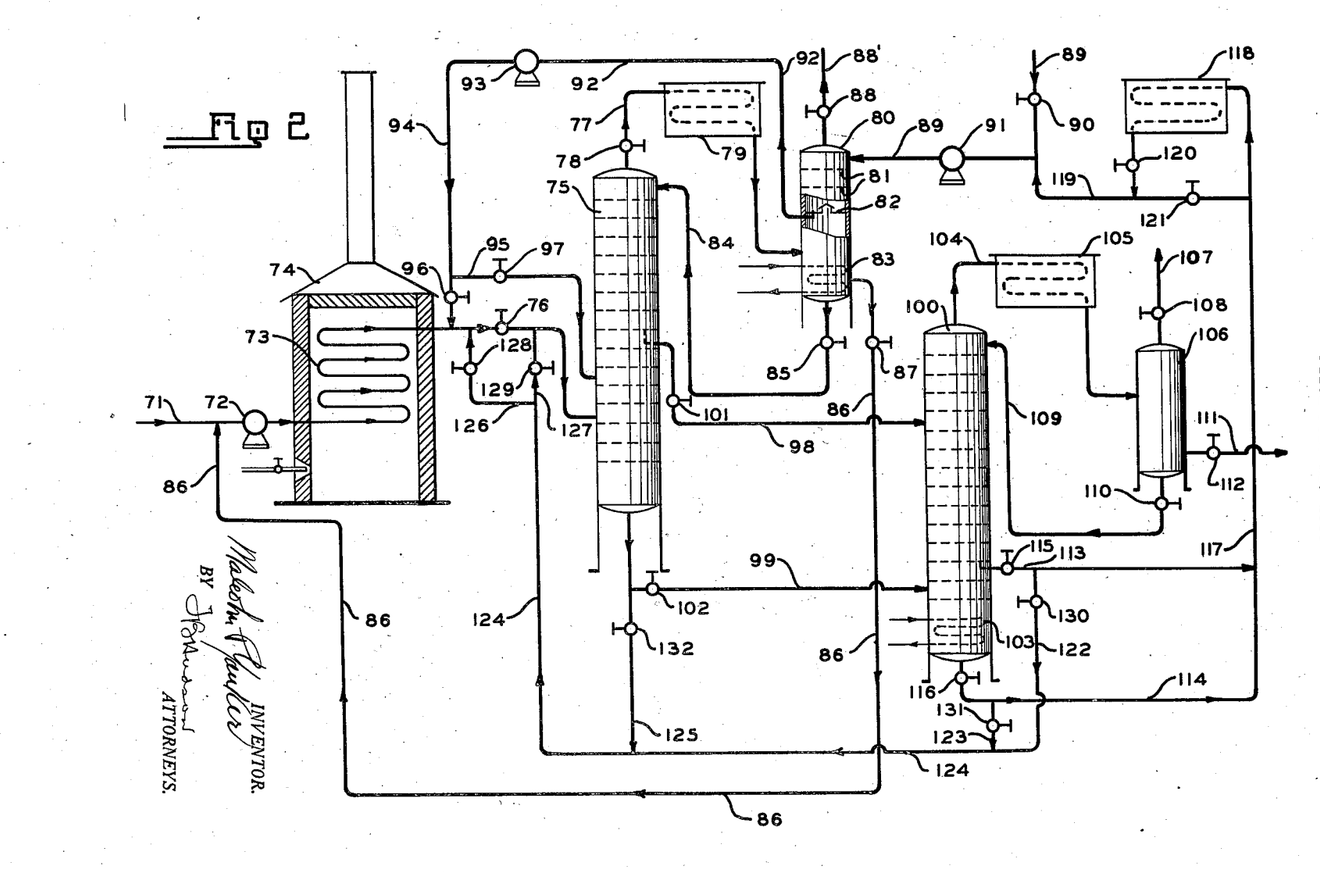
Figure 2 illustrates diagrammatically another form of apparatus for accomplishing the aforesaid principal object of my invention, in particular by the second and third methods described above.

Referring to Fig. 2, normally gaseous hydrocarbons, preferably under sufficient pressure to maintain them in the liquid state, will be drawn through pipe 71 by pump 72 and charged thereby through polymerizing coil 73 mounted in a furnace 74 into a high pressure fractionator 75. A valve 76 mounted in the outlet of polymerizing coil 73 will be manipulated to maintain any desired pressure on the hydrocarbons undergoing polymerization in the coil 73. In passing through polymerizing coil 73, the normally gaseous hydrocarbons will be subjected to sufficient heat generated in furnace 74 to polymerize at least a portion of the normally gaseous hydrocarbons to gasoline and heavier normally liquid hydrocarbons. As a result a mixture of liquid and vaporous hydrocarbons will emerge from coil 73 and enter fractionator 75 wherein a separation between vapor and liquid will be effected. Vapor containing substantially all the unconverted butane will flow upwards through fractionator 75 which is preferably of the bubble tray type, and will pass therefrom through pipe 77 in which is mounted valve 78, and thence through condenser 79 wherein a portion of the vapors will be condensed and a mixture of condensate and uncondensed vapors will then flow into accumulator 80 which will preferably be fitted with bubble trays 81 and a collector plate 82. Heating fluid may be circulated through a coil 83 located in the lower portion of accumulator 80 to aid in separating uncondensed vapors from condensed liquid. As a result of the temperature, pressure and reflux conditions maintained in fractionator 75 and accumulator 80 the liquid which will collect in the lower portion of the accumulator 80 will consist principally of butane and a portion thereof will be returned through pipe 84 to the upper portion of fractionator 75 to serve as reflux and sufficient liquid will be thus returned to condense substantially all material of the gasoline and heavier range from the vapors in fractionator 75. A valve 85 mounted in pipe 84 will be manipulated to control the amount of such reflux returned to fractionator 75. Liquid in excess of that returned to fractionator 75 will be withdrawn from the lower portion of accumulator 80 through a pipe 86 in which is mounted a valve 87 and returned to pipe 71 where it will be mixed with the original charge and again pass through the polymerizing coil 73 in order that additional quantities of gasoline and heavier products may be produced therefrom.

Gases separated from the liquid in accumulator 80 will flow upwards over collector plate 82 and bubble trays 81 and the gases reaching the upper portion of accumulator 80 will pass therefrom through pipe 88' in which is mounted a valve 88 which may be manipulated to control the pressure in the preceding portion of the high pressure fractionating system comprising fractionator 75, condenser 79, accumulator 80 and their interconnecting pipes.

Relatively heavy oil of the gas oil or distillate type will be fed through a pipe 89 in which is mounted a valve 90, by means of a pump 91 into the upper portion of accumulator 80 and will flow downwardly therein over bubble trays 81 and will contact the gases flowing upward through accumulator 80 and as a result of contact with the gases will absorb and condense additional liquefiable constituents therefrom. These liquefiable constituents will comprise the major portion of the butane remaining in the gases after the initial separation in the lower portion of accumulator 80. This relatively heavy oil including the absorbed constituents of the gases will collect on collector plate 82 which will be so designed as to prevent any of the heavy oil reaching the lower portion of the accumulator 80 thus avoiding contamination of the butane reflux and recycle stock with heavy oil. The liquid collecting on collector plate 82 will be withdrawn from accumulator 80 through pipe 92 by pump 93 and will be pumped through pipe 94 into the outlet of polymerizing coil 73 and thence together with the products of polymerization into fractionator 75. Or the liquid passing through pipe 94 may pass directly into fractionator 75 by way of pipe 95. Valves 96 and 97 mounted in pipes 94 and 95 respectively will be manipulated to control the quantity of heavy oil entering at either of the described points. Introduction of this relatively heavy oil including the absorbed constituents into fractionator 75 will, among other things, permit the absorbed constituents to be vaporized in fractionator 75 due to contact with the high temperature products of polymerization introduced into fractionator 75 from coil 73. The vaporized constituents will then pass upward through fractionator 75 and will pass therefrom through pipe 77 together with the butane and lighter vapors from the polymerizing coil 73 and will be condensed in condenser 79 and will increase the quantity of butane collecting in accumulator 80. The gasoline and heavier products which will be condensed in fractionator 75 and the heavy oil introduced into and subsequently stripped of its absorbed constituents in fractionator 75 in the above described manner will be withdrawn through pipes 98 and/or 99 to a low pressure fractionator 100.

Valves 101 and 102 located in pipes 98 and 99 respectively will be manipulated to regulate the quantities of liquid withdrawn through each of these pipes. As described above in connection with major process of this invention, fractionator 100 will be maintained under substantially lower pressure than fractionator 75. As a result of passing from a region of relatively high pressure to one of relatively low pressure the gasoline and heavier liquids which will enter fractionator 100 by way of pipe 98 and/or 99 will at least partially vaporize and separate into vapors and liquid. The vaporization and separation being aided if necessary by circulating a heating fluid through a heating coil 103 located in the lower portion of fractionator 100. The vapors thus separated from unvaporized liquid will flow upwards through fractionator 100 and the vapors comprising the gasoline and lighter products of the process reaching the upper portion of fractionator 100 will flow therefrom through a pipe 104, thence through a condenser 105 in which the gasoline contained in the vapors will be condensed and a mixture of liquid gasoline and uncondensed vapors will then flow from condenser 105 into a gasoline accumulator 106 in which uncondensed vapors will separate from liquid gasoline and pass from accumulator 106 through a pipe 107 in which is mounted a valve 108 which will be manipulated to regulate and maintain any desired pressure on the low pressure fractionating system comprising fractionator 100, condenser 105, accumulator 106 and their interconnecting pipes. A portion of the gasoline which will collect in accumulator 106 will be returned through a pipe 109 to the upper portion of fractionator 100 and a valve 110 mounted in pipe 109 will be manipulated to regulate the quantity of gasoline returned to fractionator 100 so as to effect condensation of all materials heavier than gasoline in fractionator 100. A pipe 111 in which is mounted a valve 112 leads from the lower portion of accumulator 106 and the gasoline product in excess of that required for refluxing fractionator 100 will be withdrawn through pipe 111 to final storage, not shown.

The materials heavier than gasoline contained in the vapors flowing upward in fractionator 100 will be condensed by contact with the reflux introduced into fractionator 100 from pipe 109 and will flow downwardly through the fractionator 100 and together with unvaporized liquid will be withdrawn from fractionator 100 through pipes 113 and/or 114 in which are mounted valves 115 and 116 respectively for the purpose of regulating the quantities of liquids so withdrawn. The liquids so withdrawn may be further utilized in the process as follows: The liquid withdrawn from fractionator 100 through pipe 113 may be passed either alone or together with the liquid withdrawn through pipe 114 by way of a pipe 117 through a cooler 118 and thence after cooling by way of pipe 119 into pipe 89 through which it then enters accumulator 80 to serve as the relatively heavy oil for the absorption of butane from the gases flowing upward through accumulator 80 as previously described. A valve 120 is mounted in the outlet pipe of condenser 118 and a valve 121 is mounted in pipe 119 to provide for by-passing the cooler 118 if desired.

Instead of utilizing the oil withdrawn from fractionator 100 as absorption oil in accumulator 80 in the manner described, the oil may be passed from pipes 113 and 114 into and through pipes 122 and 123 respectively into a pipe 124, through which this oil, which may also be joined by heavy oil withdrawn from fractionator 75 through a pipe 125, is delivered into the outlet pipe of polymerizing coil 73. This oil may enter the outlet pipe of coil 73 either between the furnace 74 and valve 76 by way of a pipe 126 or between the valve 76 and fractionator 75 by way of a pipe 127. Valves 128 and 129 mounted in pipes 126 and 127 respectively will be manipulated to regulate the quantity of oil entering either one or both of these points. Valves 130 in pipe 122, 131 in pipe 123, and 132 in pipe 125 will be manipulated to regulate the quantities of oil returned from either one or both of the fractionators 75 and 100 to the outlet of coil 73 by way of pipe 124.

As described above in connection with Fig. 1 the quantity of oil returned through pipes 94 and 124 to fractionator 75 by way of the outlet pipe of coil 73 will be relatively large in comparison with the quantity of oil necessary to merely stop the conversion reaction in the outlet to coil 73. This quantity will vary with the volume of charge to coil 73 and the temperature of polymerization. The ratio of such oil to the charge will vary usually between two volumes of oil to three volumes of charge per day and two volumes of oil to one of charge, although these particular ratios may also be further varied depending upon conditions. There is no critical relationship between the relative volumes of oil introduced by way of pipes 94 and 124. Where oil is introduced into the outlet of coil 73 through both pipes it will usually be found best to control the quantity entering by way of pipe 94 in accordance with the quantity needed for absorption purposes in accumulator 80. Any additional oil necessary in the outlet coil 73 can then be supplied through pipe 124.

The temperature range employed in the polymerization reaction will be the same as described above in connection with the major process of this invention.

The pressures employed in polymerizing step and in the high and low pressure fractionating system will also be similar to those described in connection with the major process.

While I have described my invention by reference to a number of different forms of apparatus in which it may be employed, I do not intend to be limited to such apparatus as it will be apparent to those skilled in the art that many changes and modifications may appropriately be made in the form and arrangement of apparatus without departure from the substance of my invention which is defined in the appended claims.

I claim:

1. A process for the conversion of normally gaseous hydrocarbons to normally liquid hydrocarbons which comprises subjecting normally gaseous hydrocarbons to suitable conditions of temperature and pressure to effect conversion of at least a portion thereof to normally liquid hydrocarbons, first rectifying the products of conversion to sharply separate the normally gaseous from the normally liquid products, partially condensing the said normally gaseous products of conversion, separating the resulting condensate from uncondensed gases, returning a part of said condensate for reprocessing in said rectifying step, contacting the said uncondensed gases with a relatively heavy hydrocarbon oil to absorb additional constituents from said uncondensed gases and mixing the said heavy oil containing the absorbed constituents with said products of conversion prior to said first rectifying step, all said rectifying, separating, condensing, and contacting steps being carried out under relatively high super-atmospheric pressure.

2. A process for the conversion of normally gaseous hydrocarbons to normally liquid hydrocarbons which comprises charging said normally gaseous hydrocarbons and subjecting the same to suitable conditions of temperature and pressure to effect conversion of at least a portion thereof to normally liquid hydrocarbons, introducing into the resulting products of conversion a relatively heavy hydrocarbon oil, passing said products of conversion and said heavy hydrocarbon oil into a separator and therein separating the resulting mixture into vapors lighter than gasoline and gasoline and heavier liquid products, returning a portion of said vapors lighter than gasoline for admixture with said relatively heavy hydrocarbon oil and introducing it together therewith into said resulting products of conversion, and condensing other portions of said vapors and returning a portion of the condensate thereof to said separator, and returning another portion of said condensate for reprocessing with the normally gaseous hydrocarbons originally charged.

3. A process for converting normally gaseous hydrocarbons into normally liquid hydrocarbons, which comprises subjecting said gaseous hydrocarbons to such conditions of temperature and pressure as will convert at least a portion thereof into normally liquid hydrocarbons, separating the products of said conversion into a liquid portion and a gaseous portion, passing a stream of hydrocarbon liquid in contact with said separated gaseous portion, and introducing said stream of hydrocarbon liquid and the gases absorbed therein into the products of said gaseous hydrocarbons after the same have been subjected to said temperature and pressure conditions.

4. A process for converting normally gaseous hydrocarbons into normally liquid hydrocarbons, which comprises subjecting said gaseous hydrocarbons to such conditions of temperature and pressure as will convert at least a portion thereof into normally liquid hydrocarbons, rectifying the products of said conversion under relatively high super-atmospheric pressure to separate the same into a liquid portion and a gaseous portion, passing a stream of hydrocarbon liquid in contact with said separated gaseous portion to absorb a part thereof, and introducing said stream of hydrocarbon liquid and the gases absorbed therein into the products of said gaseous hydrocarbons after the same have been subjected to said temperature and pressure conditions.

5. A process for converting normally gaseous hydrocarbons into normally liquid hydrocarbons, which comprises subjecting said gaseous hydrocarbons to such conditions of temperature and pressure as will convert at least a portion thereof into liquid hydrocarbons, admixing with the products of said conversion a hydrocarbon liquid having gases absorbed therein, separating said mixture into a liquid portion and a gaseous portion, segregating and collecting said gaseous portion, and passing a stream of hydrocarbon liquid in contact with said gaseous portion to absorb a part thereof and using said stream of hydrocarbon liquid with said gases absorbed therein as the said liquid admixed with said products of conversion.

6. In the process for converting hydrocarbon gases which are normally gaseous at atmospheric temperature and pressure into liquid hydrocarbon products boiling within the gasoline range, the steps comprising scrubbing a dilute olefinic gas containing hydrogen and methane with a hydrocarbon oil to form an enriched absorber oil, eliminating hydrogen, methane and undissolved gases from the system, passing the enriched absorber oil to a stripping zone and separating dissolved gases from the enriched absorber oil by heating the same at an elevated pressure, liquefying a part of said separated gases while maintained under an elevated pressure by cooling, polymerizing said liquefied gases into normally liquid hydrocarbon products in a heating zone at elevated temperatures and pressures, passing the polymerized products from said heating zone into the stripping zone, and separating unreacted gases from normally liquid hydrocarbon materials, withdrawing the normally liquid hydrocarbon materials from said stripping zone and separating therefrom liquid hydrocarbon products boiling within the gasoline range.

7. In the process for converting hydrocarbon gases which are normally gaseous at atmospheric pressure and temperature into normally liquid hydrocarbons boiling within the gasoline range, the steps comprising scrubbing normally gaseous hydrocarbons with a hydrocarbon oil to form an enriched absorber oil, eliminating undissolved gases from the system, passing the enriched absorber oil into a stripping zone and separating the dissolved gases from the absorber oil, polymerizing the gases separated from the absorber oil into liquid hydrocarbon products by heating the same in a reaction zone to a temperature within the range of 900–1200° F. while maintained at a pressure within the range of 500–3000 lbs. per square inch, passing the hot reaction products from the reaction zone into said stripping zone and separating unreacted gases from liquid hydrocarbon materials, withdrawing the normally liquid hydrocarbon materials from said stripping zone and separating therefrom liquid hydrocarbon products boiling within the gasoline range.

8. In a process for converting hydrocarbon gases which are normally gaseous at atmospheric pressure and temperature into normally liquid hydrocarbon materials, the steps comprising scrubbing normally gaseous hydrocarbons at elevated pressure with a hydrocarbon oil, eliminating undissolved gases from the system, separating dissolved gases from said hydrocarbon oil by heating the same at a pressure higher than the pressure at which they are absorbed in said hydrocarbon oil, liquefying a part of said separated gases by cooling, polymerizing said liquefied gases into liquid products at temperatures of 900–1200° F. and under pressures of 500–3000 pounds per square inch, mixing with the hot polymerized reaction products a portion of the enriched hydrocarbon absorber oil produced by scrubbing normally gaseous hydrocarbons with the hydrocarbon oil, passing the admixture into a separating zone, and separating the liquid products from unreacted gases.

9. In a process for converting hydrocarbon gases which are normally gaseous at atmospheric pressure and temperature into normally liquid hydrocarbons boiling within the gasoline range, the steps comprising scrubbing said gases at elevated pressure with a hydrocarbon oil of the gas oil to form an enriched absorber oil; eliminating undissolved gases from the system, separating dissolved gases from said enriched absorber oil by heating the enriched absorber oil while maintained at a pressure higher than the pressure at which the gases were absorbed by said hydrocarbon oil, liquefying a substantial part of said separated gases while under the higher pressure by cooling, polymerizing said liquefied gases into liquid hydrocarbon products at temperatures of 900–1200° F. and under pressure of 500–3000 lbs. per square inch, mixing the hot polymerized reaction products with a portion of the enriched absorber oil, passing the admixture into a separating zone and separating liquid products from unreacted gases.

10. In a process for converting hydrocarbon gases which are normally gaseous at atmospheric pressure and temperature into normally liquid hydrocarbons boiling within the gasoline range, the steps comprising scrubbing said gases at elevated pressure with a hydrocarbon oil to form an enriched absorber oil, eliminating undissolved gases from the system, passing the enriched absorber oil to a stripping zone and separating dissolved gases from said enriched absorber oil by heating the same while maintained at a pressure higher than the pressure at which the gases were absorbed in said hydrocarbon oil, liquefying a substantial part of said separated gases while under the higher pressure by cooling, polymerizing said liquefied gases into liquid hydrocarbons boiling within the gasoline range at temperatures of 900–1200° F. and under pressures of 500–3000 lbs. per square inch, mixing the hot polymerized reaction products with a portion of the enriched absorber oil, passing the admixture into said stripping zone and separating liquid hydrocarbon products from unreacted gases.

11. In a process for converting normally gaseous hydrocarbons into normally liquid hydrocarbons boiling within the gasoline range, the steps comprising scrubbing normally gaseous hydrocarbons at an elevated pressure with a hydrocarbon oil to form an enriched absorber oil, eliminating undissolved gases from the system, passing the enriched absorber oil into a stripping zone and separating dissolved gases from said enriched oil by heating the same while maintained at a pressure higher than the pressure at which the gases were absorbed in said hydrocarbon oil, liquefying a substantial part of said separated gases while under the higher pressure by cooling, polymerizing said liquefied gases in a heating zone at temperatures of 900–1200° F. and under pressures of 500–3000 pounds per square inch into normally liquid hydrocarbons boiling within the gasoline range, mixing the hot reaction products from the heating zone with a portion of the enriched absorber oil, passing the admixture into the stripping zone and separating unreacted gases from the liquid hydrocarbon products.

12. In a process for converting normally gaseous hydrocarbon into normally liquid hydrocarbon boiling within the gasoline range, the steps comprising scrubbing normally gaseous hydrocarbons at an elevated pressure with a hydrocarbon oil to form an enriched absorber oil, eliminating undissolved gases from the system, passing the enriched absorber oil into a stripping zone and separating dissolved gases from said enriched oil by heating the same while maintained at a pressure higher than the pressure at which the gases were absorbed in said hydrocarbon oil, liquefying a substantial part of said separated gases while under the higher pressure by cooling, polymerizing said liquefied gases in a heating zone at temperatures of 900–1200° F. and under pressures of 500–3000 pounds per square inch into normally liquid hydrocarbon products boiling within the gasoline range, mixing the hot reaction products from the heating zone with a portion of the enriched absorber oil, passing the admixture into the stripping zone and withdrawing unreacted gases from the top of said stripper, withdrawing the liquid products from the lower part of said stripping zone and separating therefrom normally liquid hydrocarbons boiling within the gasoline range.

13. In a process for converting hydrocarbon gases which are normally gaseous at atmospheric pressure and temperature into normally liquid hydrocarbons, the steps comprising scrubbing normally gaseous hydrocarbons at an elevated pressure with a hydrocarbon oil to form an enriched absorber oil, eliminating undissolved gases from the system, separating the dissolved gases from the enriched absorber oil in a stripping zone by heating the enriched absorber oil while maintained at a pressure higher than the pressure at which said gases were absorbed, liquefying a substantial part of said separated gases while under elevated pressure by cooling, polymerizing said liquefied gases in a heating zone into liquid hydrocarbons at elevated temperatures 900–1200° F. and under pressures of 500–3000 pounds per square inch, passing the reaction products from the heating zone into said stripping zone, withdrawing the liquid products from the lower part of said stripping zone and separating therefrom the polymerized normally liquid hydrocarbons.

14. In a process for converting hydrocarbon gases which are normally gaseous at atmospheric temperature and pressures into normally liquid hydrocarbons boiling within the gasoline range, the steps comprising scrubbing hydrocarbon gases containing methane at an elevated pressure with a hydrocarbon oil to form an enriched absorber oil, eliminating undissolved gases and methane from the system, passing the enriched absorber oil to a stripping zone and separating dissolved gases from said enriched absorber oil by heating the same while maintained at a pressure higher than the pressure at which the gases were absorbed in said hydrocarbon oil, liquefying a substantial part of said separated gases while under the higher pressure by cooling, polymerizing said liquefied gases in a reaction zone at elevated temperatures and pressures into liquid hydrocarbons, mixing the hot reaction products from the reaction zone with a portion of the enriched absorber oil, passing the admixture into said stripping zone and separating unreacted gases from liquid hydrocarbon products, withdrawing said liquid hydrocarbon products from the stripping zone and separating therefrom liquid hydrocarbons boiling within the gasoline range.

15. The process of producing normally liquid low boiling gasoline-like hydrocarbons from relatively low boiling normally gaseous hydrocarbons which comprises scrubbing a mixture of such gases containing hydrogen, methane and higher boiling normally gaseous hydrocarbons having from two to four carbon atoms per molecule with a relatively high boiling absorbent oil to effect the separation of absorbed hydrocarbons having three or four carbon atoms per molecule from unabsorbed hydrogen and methane, removing the thereby enriched absorbent and introducing it with absorbed gaseous hydrocarbons into a stream of hot polymerized products from a gas-conversion operation to thereby partially cool said products and effect a stripping of absorbed constituents from the absorbent oil, removing the stripped absorbent oil, and returning at least a portion of the thus removed oil to the initial separating step for treatment of further quantities of gases, fractionating the commingled thereby cooled vaporous products from the gas-conversion operation and the normally gaseous hydrocarbons removed in the stripping operation to recover a gasoline-like product, a lean gas fraction containing hydrogen and methane, and an intermediate fraction substantially free from hydrogen and methane and comprising principally gaseous hydrocarbons having three or four carbon atoms per molecule including previously absorbed gases contained in the absorbent oil, delivering said intermediate fraction without further distillation thereof to the aforesaid gas-conversion operation where it is subjected to elevated temperature and pressure to effect a conversion of said normally gaseous hydrocarbons to normally liquid products, and delivering the products from said gas conversion operation to the stripping operation as aforesaid.

16. The process of producing normally liquid low boiling gasoline-like hydrocarbons from relatively low boiling normally gaseous hydrocarbons which comprises scrubbing a mixture of such gases containing hydrogen, methane and higher boiling normally gaseous hydrocarbons having from two to four carbon atoms per molecule with a relatively high boiling absorbent oil to effect the separation of absorbed hydrocarbons having three or four carbon atoms per molecule from unabsorbed hydrogen and methane, removing the thereby enriched absorbent and introducing it with absorbed gaseous hydrocarbons into a stream of hot polymerized products from a gas-conversion operation to thereby partially cool the said products and effect a stripping of absorbed constituents from the absorbent oil, removing the stripped absorbent oil, fractionating the commingled thereby cooled vaporous products from the gas-conversion operation and the normally gaseous hydrocarbons removed in the stripping operation to recover a gasoline-like product, a lean gas fraction containing hydrogen and methane and a rich gas fraction substantially free from hydrogen and methane and comprising principally gaseous hydrocarbons having three or four carbon atoms per molecule including previously absorbed gases contained in the absorbent oil, delivering said rich gas fraction without further distillation thereof to the aforesaid gas-conversion operation for subjection as aforesaid to elevated temperature and pressure to effect a conversion of said normally gaseous hydrocarbons to normally liquid products, delivering the products from said gas-conversion operation to the stripping operation as aforesaid, and returning said lean gas fraction to the scrubbing operation for recovery of gaseous polymerizable constituents and separation of hydrogen and methane.

17. In the manufacture of normally liquid gasoline-like products from normally gaseous hydrocarbons, the combination of steps which comprises subjecting a stream of normally gaseous hydrocarbons to elevated pressure and temperature sufficient to effect a conversion thereof to normally liquid products, introducing normally gaseous hydrocarbons into an absorption zone, contacting said gases in said absorption zone with an absorbent hydrocarbon oil to thereby dissolve normally gaseous hydrocarbons of from two to four carbon atoms in said oil, contacting the hot products of conversion with said enriched absorbent oil to cool said products and strip normally gaseous hydrocarbons from said absorbent oil, fractionating the thereby cooled products including said stripped gases to separate any constituents heavier than gasoline, gasoline-like products and normally gaseous hydrocarbons including those stripped from the absorbent oil, and recycling normally gaseous hydrocarbons thus obtained without further distillation thereof to the conversion operation as charging stock therefor.

18. A process in accordance with claim 17 wherein the normally gaseous products separated from the products of conversion are divided into light and heavy fractions, the light fraction being returned to the absorption zone and the heavy fraction constituting the charge to the conversion operation.

19. In the manufacture of normally liquid gasoline-like products from normally gaseous hydrocarbons, the combination of steps which comprises subjecting a stream of normally gaseous hydrocarbons to elevated pressure and temperature sufficient to effect a conversion thereof to normally liquid products, contacting the hot products of conversion with an absorbent hydrocarbon oil containing a substantial amount of previously absorbed normally gaseous hydrocarbons to cool said products and strip the absorbed gases from the absorbent oil, fractionating the thereby cooled products including said stripped gases to separate any constituents heavier than gasoline, a gas fraction relatively lean in polymerizable constituents, a gas fraction relatively rich in polymerizable constituents including previously absorbed gases contained in the absorbent oil and a gasoline-like fraction, delivering the relatively rich fraction without further distillation thereof to the conversion zone as aforesaid, scrubbing the relatively lean fraction with absorbent hydrocarbon oil to recover gaseous polymerizable constituents therefrom, and employing the thereby enriched oil to directly contact and cool the hot products of conversion as aforesaid.

MALCOLM P. YOUKER.

CERTIFICATE OF CORRECTION.

Patent No. 2,189,645. February 6, 1940.

MALCOLM P. YOUKER.

It is hereby certified that error appears in the printed specification of the above numbered patent requiring correction as follows: Page 7, second column, line 73, claim 9; for "hydrcarbon" read hydrocarbon; page 8, first column, line 3, after the word "oil" second occurrence, insert type; page 9, first column, line 7, claim 15, for "prducts" read products; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.